(12) United States Patent
Nolan

(10) Patent No.: US 8,944,302 B2
(45) Date of Patent: Feb. 3, 2015

(54) PLASTIC BAG HOLDER FOR A VEHICLE

(71) Applicant: Vernon L. Nolan, Screven, GA (US)

(72) Inventor: Vernon L. Nolan, Screven, GA (US)

( * ) Notice: Subject to any disclaimer, the term of this patent is extended or adjusted under 35 U.S.C. 154(b) by 0 days.

(21) Appl. No.: 13/945,319

(22) Filed: Jul. 18, 2013

(65) Prior Publication Data

US 2014/0326762 A1 Nov. 6, 2014

Related U.S. Application Data

(60) Provisional application No. 61/818,501, filed on May 2, 2013.

(51) Int. Cl.
*B60R 7/04* (2006.01)
*B60N 2/44* (2006.01)

(52) U.S. Cl.
CPC ......... *B60R 7/043* (2013.01); *B60N 2002/4405* (2013.01)
USPC ...................................................... 224/275

(58) Field of Classification Search
CPC .................. A45F 5/1026; B60R 7/043; B60R 2011/0017; B60R 2011/0012; B60R 2011/008; B60R 2011/0276; B60R 2011/0059; B60R 2011/0071; B60R 7/04; B60R 7/10; B60N 2002/4405

USPC ................ 224/279, 925, 545, 547, 555, 563; 294/159; 248/215, 301

See application file for complete search history.

(56) References Cited

U.S. PATENT DOCUMENTS

| | | | | |
|---|---|---|---|---|
| 5,791,614 | A * | 8/1998 | Sims | 248/230.7 |
| 6,045,019 | A * | 4/2000 | Moses | 224/257 |
| 6,651,941 | B1 * | 11/2003 | Kinsel | 248/100 |
| 6,685,016 | B2 * | 2/2004 | Swaim et al. | 206/320 |
| 7,784,864 | B2 * | 8/2010 | Feder | 297/188.06 |
| 2011/0049203 | A1 * | 3/2011 | Stark | 224/255 |

FOREIGN PATENT DOCUMENTS

GB 2439323 * 6/2006 ............... B60R 7/04

* cited by examiner

*Primary Examiner* — Adam Waggenspack
(74) *Attorney, Agent, or Firm* — Jonathan R. Smith; Jonathan Rigdon Smith, P.C.

(57) ABSTRACT

An elongate strap to be used to hold a trash bag in a vehicle has a specially-shaped head rest post catch portion at one end and a specially-shaped bag handle hook portion at the other. The catch portion is placed to partially encircle both head rest posts on a vehicle seat, allowing the strap to drape over the shoulder of the seat so that the hook portion hangs between the seats. The hook portion comprises two spaced-apart funnel shaped cuts which hold the handles of a plastic grocery bag apart for easy disposal of trash by either left or right seat occupant.

5 Claims, 5 Drawing Sheets

PLASTIC BAG HOLDER FOR A VEHICLE

CROSS-REFERENCES TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

REFERENCE TO A BIOLOGICAL SEQUENCE LISTING

Not applicable.

BACKGROUND OF INVENTION

1. Field of the Invention

This invention is in the field of containment of trash in vehicles as well as prevention of littering on the highways 2. Description of the Related Art An existing way of containing trash in a vehicle and preventing littering is a small trash can placed on the floor or other level surface such as a center console. Providing a means for preventing the can from tipping over is to add weight or flaps or both to the bottom, such as can be opened for viewing on a Web browser at: http://sell.lulusoso.com/selling-leads/1142984/car-waste-bin-car-trash-bin-car-waste-container.mht. A disadvantage to this is that if such a container cannot be positioned on a center console or on the floor between passengers, it takes up leg room somewhere else on the floor (and might be knocked over anyway as a result of being kicked). One way of surmounting this difficulty is taught by several patents and patent applications which suspend a trash receptacle from a seat part such as the top of the seat back, the seat back pocket behind the seat, or the head rest. Most of these contain rigid parts which can be dangerous to occupants in the event of a sudden stop or crash. Those that suspend from the top of the seat back or the seat back pocket are not conveniently used by front seat passengers. There is a U.S. patent on trash receptacles suspended between the front seats, U.S. Pat. No. 5,868,294, but it involves specially-fabricated receptacles, and hanging mechanisms that either span from the driver's head rest to the passenger's or require snaps sewn into the sides of the seats. This patent also discloses a receptacle with hooks for hanging over the middle of a bench-style front seat, but bench-style front seats are increasingly rare. The devices described in this patent are complex and/or require special installation. A U.K. patent publication, no. GB2439323, describes a way of suspending an essentially cost-free ordinary plastic grocery bag from one of the head rest supporting posts using a flexible strap, but still not in a position convenient to the front seat passengers. U.S. Pat. No. 5,791,614 describes a Head Rest Mounted Hanger that performs a similar function using both of the two head rest supporting posts on one of the front seats to suspend basically any bag with a strap close to the side of the seat. While it is true that the flexible hanger of U.K. publication GB2439323 and the hanger of U.S. Pat. No. 5,791,614 appear to be low in manufacturing cost, and capable of hanging a plastic grocery bag, neither of these hold the handles of such a bag apart so that trash can be put into the bag with one hand. The former of these has the further disadvantage of swinging on the head rest post during travel, and the latter has the further disadvantage of the bag handle slipping off the hanger during travel.

There is thus a need for an apparatus that permits hanging a recyclable and cost-free bag securely between the front seats and holding the handles apart regardless of the motion of the vehicle.

BRIEF DESCRIPTION OF THE INVENTION

The instant invention is an elongate strap that, by itself, enables a plastic grocery bag to be used conveniently and inexpensively for trash disposal in a vehicle. It has a specially-shaped head rest post catch portion at one end and a specially-shaped bag handle hook portion at the other. The catch portion is placed to partially encircle both head rest posts on a vehicle seat, allowing the strap to drape over the shoulder of the seat so that the hook portion hangs between the seats. The hook portion comprises two spaced-apart funnel shaped cuts which hold the handles of a plastic grocery bag apart for easy disposal of trash by either the left or the right seat occupant. The device is more flexible in the elongate direction than in the transverse direction so that it can easily drape over seat shoulders of varying widths and shapes while at the same time resisting the tendency of weight in the bag and motion of the vehicle to pull the bag handles towards each other.

DETAILED DESCRIPTION OF THE INVENTION

Figure 1:
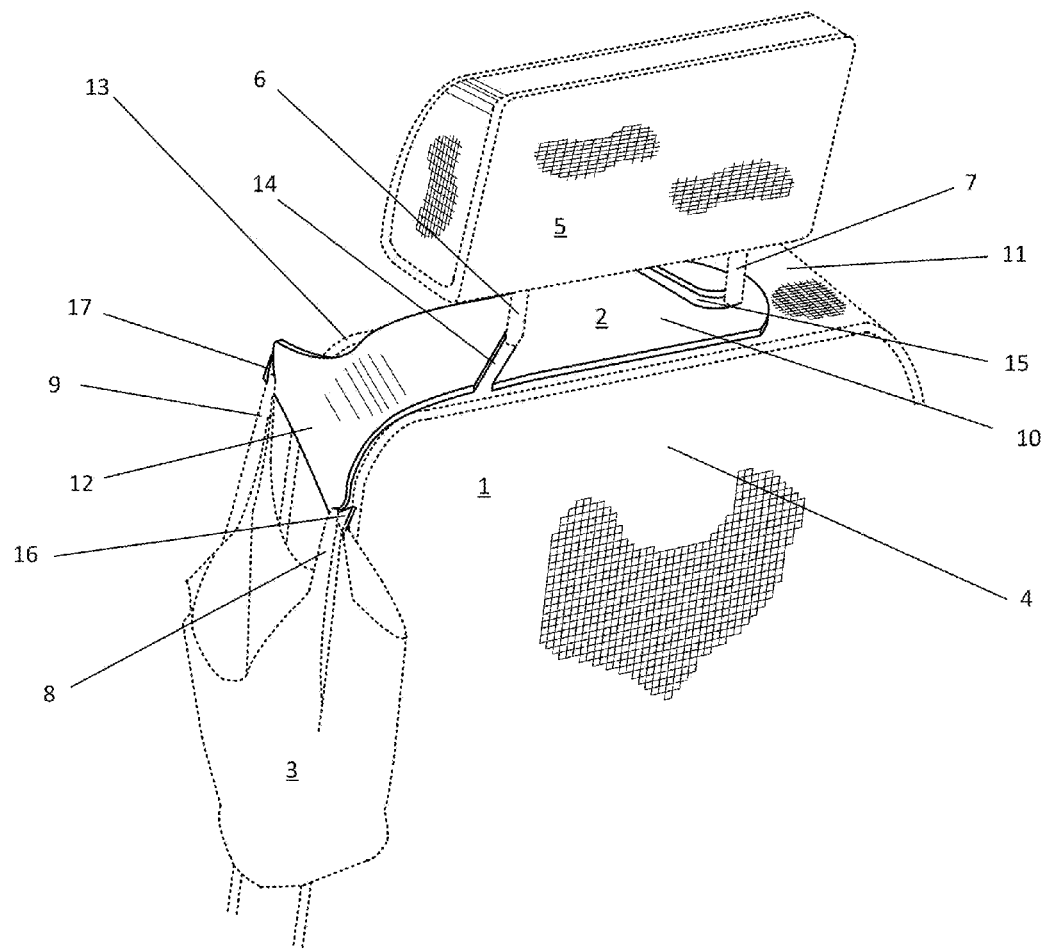
FIG. 1 is a perspective view of the instant invention in use on a vehicle seat.

Referring now to the drawings, in which like reference characters refer to like elements among the drawings, FIG. 1 is a perspective view of the instant invention in use on the front passenger's vehicle seat 1, as seen from behind the seat. The invention, a plastic bag holder, comprises an elongate flexible strap 2, to which a flexible bag 3 is attached. The bag 3, which serves the purpose of a trash receptacle, is most likely to be a recycled two-handled grocery bag having a rear handle 8 and a front handle 9. The seat comprises a seat back 4, a head rest 5, a proximal head rest support post 6 and a distal head rest support post 7. All parts shown except the strap 2 are environmental structure and are shown in dashed lines.

The strap 2 comprises two parts, a shaped catch portion 10 generally disposed along the top 11 of the seat 1, and a shaped hook portion 12 generally disposed over the left shoulder 13 of the seat 1. The catch portion 10 comprises a proximal catch cutout 14 which partially encircles the proximal head rest support post 6, and a distal catch cutout 15 which partially encircles the distal head rest support post 7. Although the invention is shown here mounted on the passenger's seat 1, it may just as well be mounted in mirror image on the driver's seat because the strap 2 is thin and flexible and the hook portion 12 may be flexed oppositely with respect to the catch portion 10.

The rear handle 8 of the bag 3 can be seen here inserted into a rear hook cutout 16 of the hook portion 12, and the front handle 9 of the bag 3 is seen inserted into the front hook cutout 17 of the hook portion 12.

Figure 2:
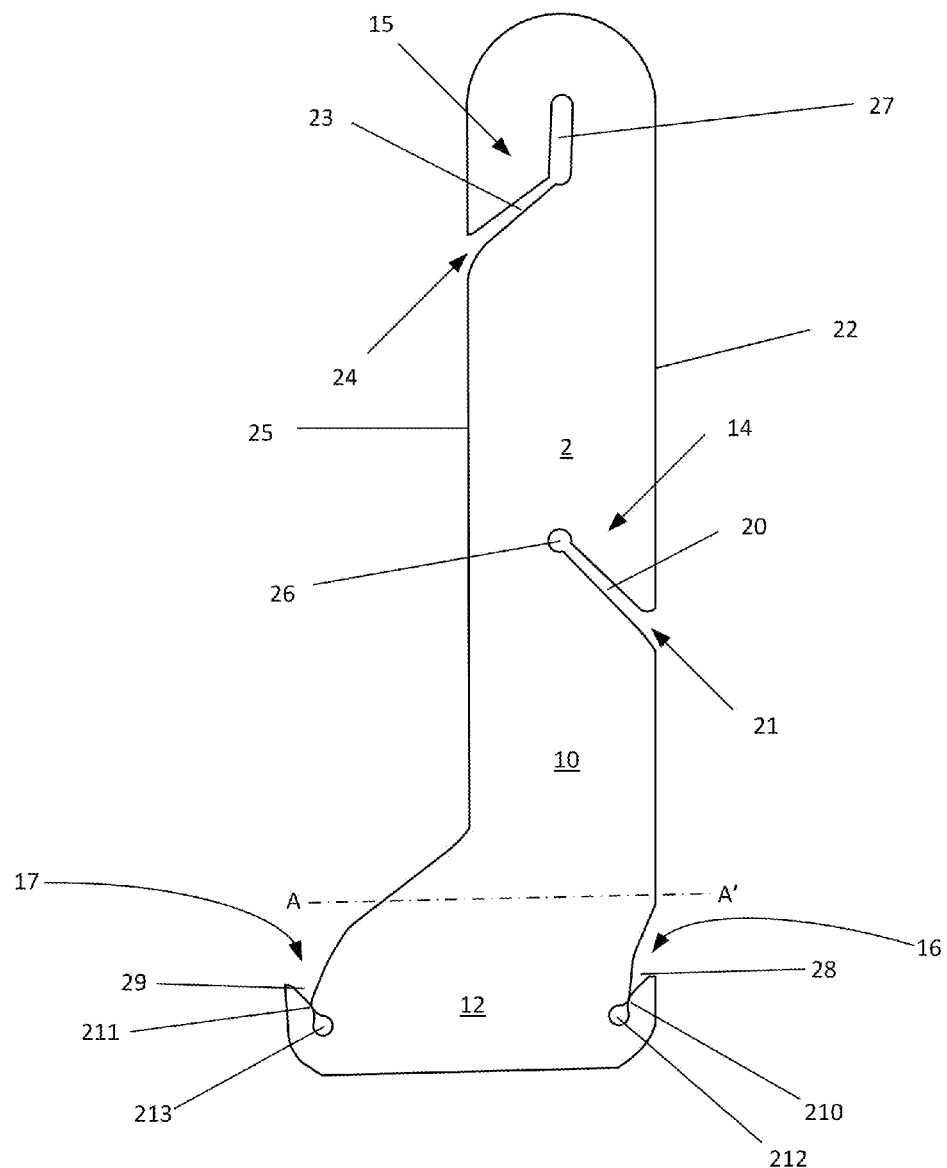
FIG. 2 is a plan view of the strap of the invention.

FIG. 2 is a plan view of the strap 2 of the invention. In the preferred embodiment it is cut to the shape shown out of flexible, strong material of about ⅛ to ⅜ inch thick throughout, and preferably is less flexible in the horizontal direction (on the page) as in the vertical direction. This variation in rigidity exists, for example, in certain belt materials that are reinforced by embedded wires running in one direction.

The actual thickness of the strap 2 is not important so long as the strap resists tearing in its weakest direction under manual strength. An alternative embodiment can be made out of a material of constant flexural strength per unit thickness if the hook portion 12 (generally below the line A-A') is thicker than the catch portion 10. Yet another embodiment can achieve this effect by applying a reinforcing layer horizontally across the hook portion 12.

The catch portion 10 of the instant invention comprises catch cutouts 14 and 15 for removably securing the strap 2 about the head rest posts 6 and 7 (not shown in this figure). These cutouts are specially shaped in accordance with the instant invention to secure the strap 2 to the head rest posts 6 and 7 in such a way as to prevent it from being inadvertently dislodged by motion of the vehicle or ordinary activity of the passengers. The proximal catch cutout 14 has a proximal slot 20 with a rounded proximal entrance 21 on the right edge 22 of the strap 2, and the distal catch cutout 15 has a distal slot 23 with a rounded distal entrance 24 on the left edge 25 of strap 2. The proximal slot 20 is cut out upwardly and to the left in this view at an angle of about 45 degrees, ending in a proximal circlet 26 near the elongate centerline B-B' of the strap 2. The distal slot 23 is cut out upwardly and to the right at about the same angle, terminating in a distal obround hole 27.

The hook portion 12 of the strap 2 has rear and front hook cutouts 16 and 17 respectively for removably securing the handles of the waste bag 3 to the strap 2. These cutouts are specially shaped in accordance with the instant invention to secure the handles of the waste bag 3 to the hook portion 12 in such a way as hold the handles apart and prevent the bag 3 from being inadvertently dislodged by motion of the vehicle or ordinary activity of the passengers. The rear and front hook cutouts 16 and 17 each have funnel portions 28 and 29, respectively, which funnel into rear and front nips 210 and 211, respectively, and then lead into rear and front teardrop holes 212 and 213, respectively.

In addition to the generally J-shape of the strap 2, the direction and shape of the cutouts in it are important to its proper functioning. The catch cutouts are positioned so that the proximal head rest post 6 will be seated within the proximal circlet 26 and the distal head rest post will be seated within the distal obround hole 27. Because the center-to-center separation of typical head rest posts is in the range of about 6 to 7.25 inches, obround hole 27 is provided to accommodate head rest posts of separation within this range. Moreover, since the strap 2 material is flexible, the invention can be used with post separations somewhat smaller or larger. The distance between the lower center 214 of the obround hole 27 and the center of the proximal circlet 26 is about 6 inches, and the obround hole 27 is approximately 1¼ inches long in the vertical direction between the lower center 214 and upper center 215 of the obround hole 27. Note that because the proximal and distal slots 20 and 23 are both aimed downward from the circlet 26 and the obround hole 27 respectively, the vertical distance between the rounded proximal entrance 21 and the rounded distal entrance 24 will also be roughly the same as the distance between the head rest posts. This enables the strap 2 to be installed easily by placing the upper end 216 of the strap 2 between the head rest posts 6 and 7 (not shown in this view) and guiding them into the rounded entrances 21 and 24. Pulling the strap 2 downwardly in this view then secures the proximal head rest post 6 in the proximal circlet 26, and seats the distal obround hole about the distal head rest post 7. By having the slots 20 and 23 at 45 degree angles, neither forward nor backward acceleration, nor side-to-side acceleration of the vehicle can dislodge the strap from the head rest posts. It can also be seen readily that the weight of the trash bag (downward in this view) will tend to tighten the strap 2 against the head rest posts.

The shape of the hook cutouts 16 and 17 is designed to reliably retain the handles of a plastic bag during travel without making them difficult to detach for disposal. Each of the rear and front hook cutouts 16 and 17 respectively has a funnel portion 28 and 29 respectively which serves as a guide for inserting the rear and front bag handles 8 and 9 (not shown in this view) into the hook portion 12 of the strap 2. Pulling down on the rear bag handle 8 will force it through the rear nip 210 and into the rear teardrop hole 212. Likewise, pulling downward on the front bag handle 9 will force it through the front nip 211 and into the front teardrop hole 213.

Finally as to FIG. 2, note that the general J-shape of the strap 2 puts the front hook cutout 17 well forward of the vertical centerline B-B' of the strap 2. This places the trash bag 3 forward of where it would be otherwise and generally more accessible to the front seat occupants. I also keeps the bag from occupying part of the rear passengers' legroom.

Figure 3:
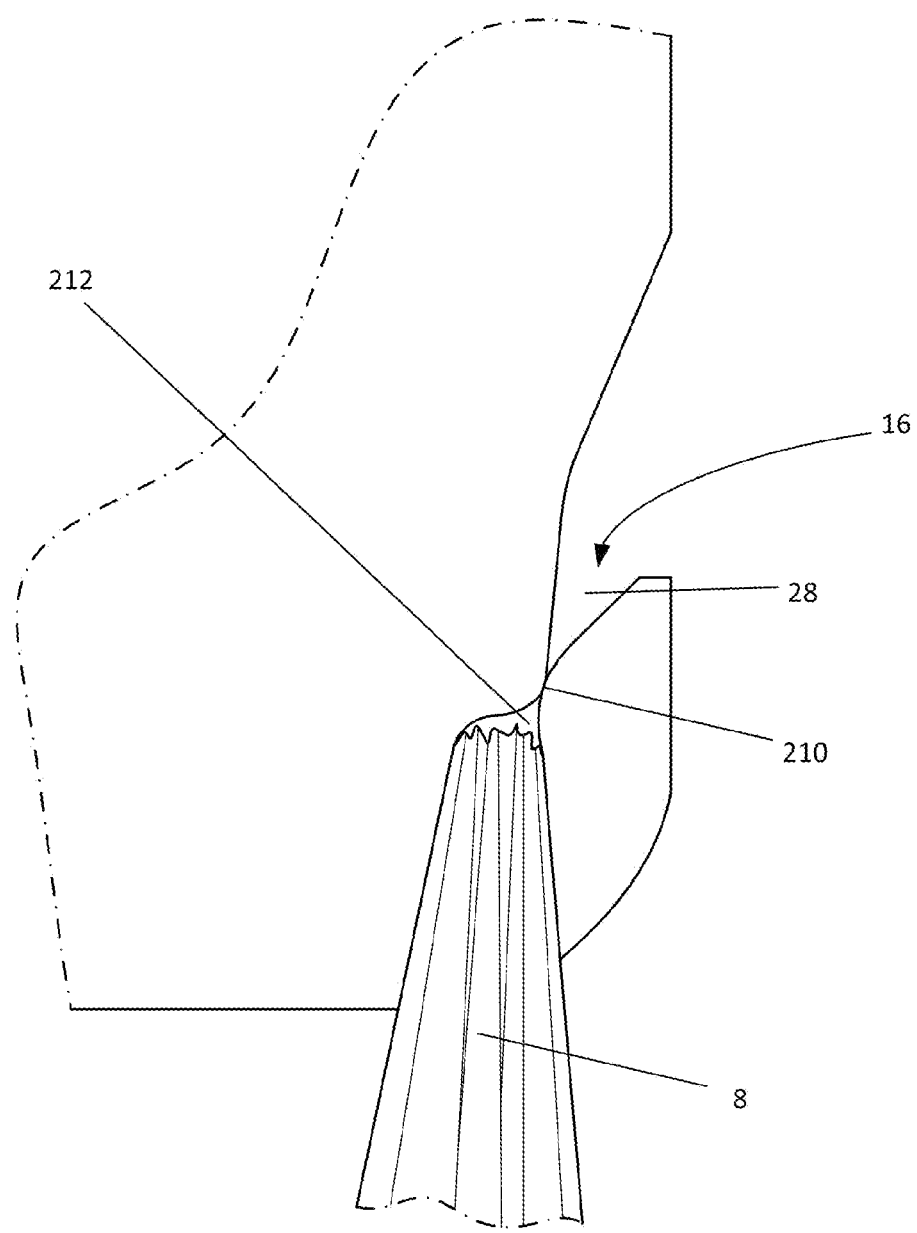
FIG. 3 is a close-up perspective view of the rear hook cutout of the instant invention gripping one handle of a plastic grocery bag under steady vehicle motion.

FIG. 3 is a close-up perspective view of the rear hook cutout 16 of the instant invention gripping one handle, in this case rear handle 8 of a plastic grocery bag 3, under steady vehicle motion. The rear nip 210 will keep the handle from emerging from the rear teardrop hole 212 during a sudden downward acceleration of the vehicle (as would occur driving over a deep pothole, for example).

Figure 4:
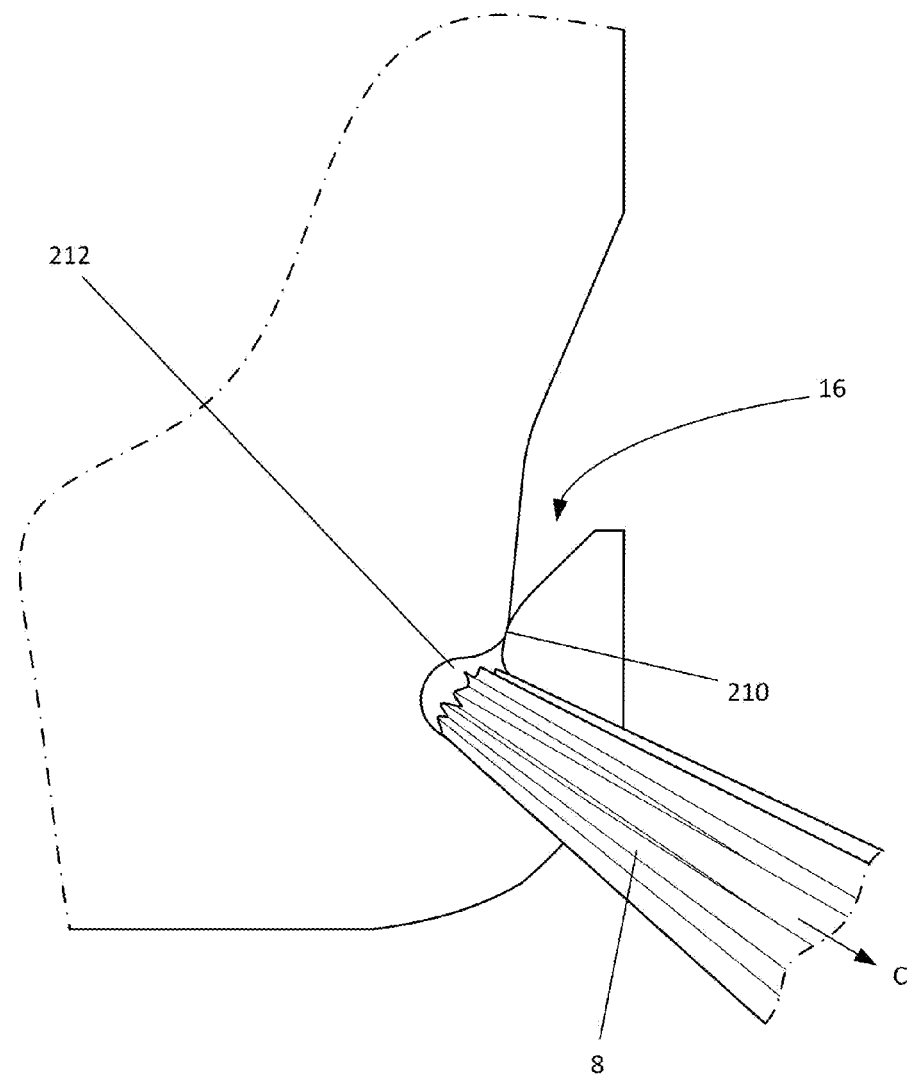
FIG. 4 is a close-up perspective view of the rear hook cutout of the instant invention gripping one handle of a plastic grocery bag under sudden acceleration.

FIG. 4 is a close-up perspective view of the rear hook cutout 16 of the instant invention gripping the rear handle 8 of a plastic grocery bag 3 under sudden acceleration. The combined force of gravity and forward acceleration pull the bag 3 and its contents in the direction C. However, no reasonable movement of the vehicle would rotate the rear bag handle 8 far enough upward or with enough force to pull it through the rear nip 210 and out of the rear teardrop hole 212.

Figure 5:
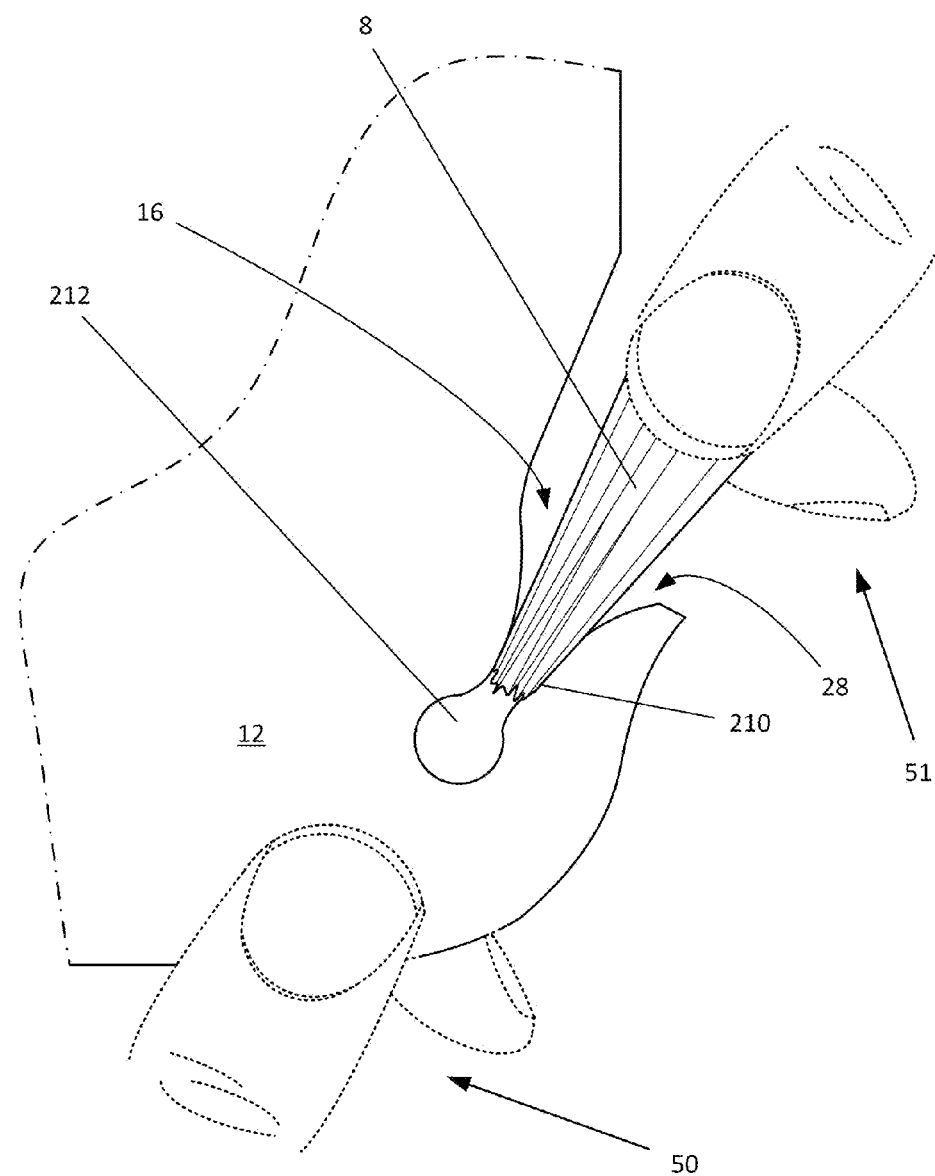
FIG. 5 is a close-up perspective view of the rear hook cutout of the instant invention while a person is removing the bag from the hook.

FIG. 5 is a close-up perspective view of the rear hook cutout 16 of the instant invention while a person is removing the bag 3 from the rear hook cutout 16. Here, a person is holding the hook portion 12 with his or her left fingers 50 while pulling the rear bag handle 8 upward with the fingers of his or her right hand 51. Because the material of the hook portion 12 is flexible and because the teardrop hole 212 is teardrop-shaped with the narrow part leading upward to the nip 210, it is a simple matter for any person to pull the handle 8 through the nip 210 to release it from the funnel 28.

The invention claimed is:
1. A bag holder, comprising:
an elongate strap having
a substantially straight rear edge, an upper end, a flexible middle portion, and a lower end;
the upper end comprising a plurality of slots through the strap ending in a like number of holes;
the centers of the holes disposed along a line parallel to the rear edge,
the line being displaced forwardly from the rear edge by a first length;
the lower end comprising
a straight resilient bottom edge substantially at right angles to, and projecting forwardly from, the rear edge;
the bottom edge being a second length substantially greater than double the first length, and comprising
a first hook portion proximate to the intersection of the rear edge and the bottom edge; and
a second hook portion proximate to the forward end of the bottom edge.

2. The bag holder of claim 1, wherein:
said
upper end is horizontally disposed on the back of a vehicle seat:
at least two of said plurality of holes encircle two vehicle head rest support posts on the vehicle seat;
said flexible middle portion is draped over the shoulder of the seat; and
said lower end is suspended along the side of the seat.

3. The bag holder of claim 2, wherein:
said first
hook portion is adapted to removably clasp one handle of a flexible bag; and
said second hook portion is adapted to removably clasp another handle of the bag.

4. A bag holder comprising:
an elongate
upper portion shaped to extend horizontally across a vehicle seat back and downwardly over one shoulder of the seat, comprising
two holes therethrough shaped to engage two vehicle seat head rest posts:
a first rear edge lying in a substantially vertical plane, the plane being a first distance behind the head rest posts; and
a lower portion depending from the upper portion, comprising
a substantially vertical second rear edge also lying in the plane; and
a straight resilient bottom edge substantially at right angles to, and projecting forwardly from, the second rear edge:
the bottom edge being a second length substantially greater than double the first length, and comprising
a first hook portion proximate to the intersection of the second rear edge and the bottom edge; and
a second hook portion proximate to the forward end of the bottom edge.

5. The bag holder of claim 4, wherein:
said
first hook portion is adapted to removably clasp one handle of a flexible bag; and
said second hook portion is adapted to removably clasp another handle of the bag.

* * * * *